(12) United States Patent
Akiyama et al.

(10) Patent No.: US 7,781,114 B2
(45) Date of Patent: Aug. 24, 2010

(54) HIGH ELECTRICAL PERFORMANCE DIRECT OXIDATION FUEL CELLS & SYSTEMS

(75) Inventors: Takashi Akiyama, Osaka (JP); Chao-Yang Wang, State College, PA (US); Guoqiang Lu, State College, PA (US)

(73) Assignees: Panasonic Corporation, Osaka (JP); Penn State Research Foundation, University Park, PA (US)

( * ) Notice: Subject to any disclaimer, the term of this patent is extended or adjusted under 35 U.S.C. 154(b) by 1065 days.

(21) Appl. No.: 11/242,944

(22) Filed: Oct. 5, 2005

(65) Prior Publication Data

US 2007/0077479 A1   Apr. 5, 2007

(51) Int. Cl.
*H01M 2/00* (2006.01)
*H01M 8/04* (2006.01)

(52) U.S. Cl. ............... 429/434; 429/429; 429/22; 429/23

(58) Field of Classification Search ............ 429/22, 429/23, 34
See application file for complete search history.

(56) References Cited

U.S. PATENT DOCUMENTS

| | | | |
|---|---|---|---|
| 5,599,638 A | 2/1997 | Surampudi et al. | |
| 5,981,096 A | 11/1999 | Hornburg et al. | |
| 6,821,658 B2 | 11/2004 | Acker et al. | |
| 2003/0148151 A1 | 8/2003 | Preidel | |
| 2004/0062964 A1* | 4/2004 | Matsuoka et al. | 429/26 |
| 2004/0209136 A1 | 10/2004 | Ren et al. | |
| 2004/0209154 A1 | 10/2004 | Ren et al. | |
| 2004/0265655 A1 | 12/2004 | Kozu et al. | |
| 2005/0008923 A1 | 1/2005 | Malhotra | |
| 2005/0084729 A1 | 4/2005 | Dohle et al. | |

FOREIGN PATENT DOCUMENTS

| | | |
|---|---|---|
| JP | 2003-223920 | 8/2003 |
| JP | 2005-011695 | 1/2005 |
| JP | 2005-025959 | 1/2005 |
| WO | WO 02/067354 A2 | 8/2002 |
| WO | WO2004/069753 A1 * | 8/2004 |

(Continued)

OTHER PUBLICATIONS

Pasaogullari & Wang, "Liquid Water Transport in Gas Diffusion Layer of Polymer Electrolyte Fuel Cells", *J. Electrochem. Soc.*, pp. A399-A406, Mar. 2004.

(Continued)

*Primary Examiner*—Patrick Ryan
*Assistant Examiner*—Muhammad Siddiquee
(74) *Attorney, Agent, or Firm*—McDermott Will & Emery LLP

(57) ABSTRACT

A direct oxidation fuel cell (DOFC) system, comprises at least one fuel cell assembly including a cathode and an anode with an electrolyte positioned therebetween, adapted for performing selected electrochemical reactions; a source of concentrated liquid fuel in fluid communication with an inlet of the anode; an oxidant supply in fluid communication with an inlet of the cathode; a liquid/gas (L/G) separator in fluid communication with outputs of the anode and cathode for receiving unreacted fuel and liquid and gaseous products of the electrochemical reactions; and a converter for catalytically converting a portion of the unreacted fuel to the liquid and gaseous products.

13 Claims, 2 Drawing Sheets

FOREIGN PATENT DOCUMENTS

WO    WO 2004/093231 A2    10/2004

OTHER PUBLICATIONS

Lim & Wang, "Development of High-Power Electrodes for a Liquid-Feed Direct Methanol Fuel Cell", *J. of Power Sources* 113(2003) 145-150.

International Preliminary Report on Patentability and Written Opinion of the International Searching Authority, issued in corresponding International Patent Application No. PCT/US2006/033533, mailed Apr. 17, 2008.

International Search Report and Written Opinion of the ISA issued in corresponding International Application No. PCT/US2006/033533, dated Feb. 19, 2007.

European Office Action issued in European Patent Application No. 06 802 476.9, mailed Dec. 30, 2008.

European Office Action issued in European Patent Application No. EP 06 802 476.9-1227 dated Dec. 8, 2009.

Pasaogullari & Wang, "Liquid Water Transport in Gas Diffusion Layer of Polymer Electrolyte Fuel Cells", *J. Electrochem. Soc.*, pp. A399-A406, Mar. 2004.

Lim & Wang, "Development of High-Power Electrodes for a Liquid-Feed Direct Methanol Fuel Cell", *J. of Power Sources* 113(2003) 145-150.

* cited by examiner

HIGH ELECTRICAL PERFORMANCE DIRECT OXIDATION FUEL CELLS & SYSTEMS

FIELD OF THE DISCLOSURE

The present disclosure relates generally to fuel cells and fuel cell systems, and more particularly, to high performance air-circulating direct oxidation fuel cells and systems that operate on highly concentrated fuel, e.g., methanol.

BACKGROUND OF THE DISCLOSURE

A direct oxidation fuel cell (DOFC) is an electrochemical device that generates electricity from electrochemical oxidation of a liquid fuel. DOFC's do not require a preliminary fuel processing stage; hence, they offer considerable weight and space advantages over indirect fuel cells, i.e., cells requiring preliminary fuel processing. Liquid fuels of interest for use in DOFC's include methanol ($CH_3OH$), formic acid, dimethyl ether (DME), etc., and their aqueous solutions. The oxidant may be substantially pure oxygen ($O_2$) or a dilute stream of oxygen, such as that in air. Significant advantages of employing a DOFC in portable and mobile applications (e.g., notebook computers, mobile phones, PDA's, etc.) include easy storage/handling and high energy density of the liquid fuel.

One example of a DOFC system is a direct methanol fuel cell (DMFC). A DMFC generally employs a membrane-electrode assembly (hereinafter "MEA") having an anode, a cathode, and a proton-conducting membrane electrolyte positioned therebetween. A typical example of a membrane electrolyte is one composed of a perfluorosulfonic acid-tetrafluorethylene copolymer, such as Nafion® (Nafion® is a registered trademark of E.I. Dupont de Nemours and Company). In a DMFC, a methanol/water solution is directly supplied to the anode as the fuel and air is supplied to the cathode as the oxidant. At the anode, the methanol ($CH_3OH$) reacts with the water ($H_2O$) in the presence of a catalyst, typically a Pt or Ru metal-based catalyst, to produce carbon dioxide ($CO_2$), protons ($H^+$ ions), and electrons ($e^-$). The electrochemical reaction is shown as equation (1) below:

$$CH_3OH + H_2O \rightarrow CO_2 + 6H^+ + 6e^- \quad (1)$$

During operation of the DMFC, the protons migrate to the cathode through the proton-conducting membrane electrolyte, which is non-conductive to electrons. The electrons travel to the cathode through an external circuit for delivery of electrical power to a load device. At the cathode, the protons, electrons, and oxygen ($O_2$) molecules, typically derived from air, are combined to form water. The electrochemical reaction is given in equation (2) below:

$$3/2 O_2 + 6H^+ + 6e^- \rightarrow 3H_2O \quad (2)$$

Electrochemical reactions (1) and (2) form an overall cell reaction as shown in equation (3) below:

$$CH_3OH + 3/2 O_2 \rightarrow CO_2 + 2H_2O \quad (3)$$

One drawback of a conventional DMFC is that the methanol partly permeates the membrane electrolyte from the anode to the cathode, such permeated methanol being termed "crossover methanol". The crossover methanol reacts with oxygen at the cathode, causing a reduction in fuel utilization efficiency and cathode potential, with a corresponding reduction in power generation of the fuel cell. It is thus conventional for DMFC systems to use excessively dilute (3-6% by vol.) methanol solutions for the anode reaction in order to limit methanol crossover and its detrimental consequences.

However, the problem with such a DMFC system is that it requires a significant amount of water to be carried in a portable system, thus diminishing the system energy density.

The ability to use highly concentrated fuel is desirable for portable power sources, particularly since DMFC technology is currently competing with advanced batteries, such as those based upon lithium-ion technology. However, even if the fuel cartridge with highly concentrated fuel (e.g., pure or "neat" methanol) carries little to no water, the anodic reaction, i.e., equation (1), still requires one water molecule for each methanol molecule for complete electro-oxidation. Simultaneously, water is produced at the cathode via reduction of oxygen, i.e., equation (2). Therefore, in order to take full advantage of a fuel cell employing highly concentrated fuel, it would be desirable to: (a) maintain a net water balance in the cell where the total water loss from the cell (mainly through the cathode) preferably does not exceed the net production of water (i.e., two water molecules per each methanol molecule consumed according to equation (3)), and (b) transport some of the produced water from the cathode to anode.

Two approaches have been developed to meet the above-mentioned goals in order to directly use concentrated fuel. A first approach is an active water condensing and pumping system to recover cathode water vapor and return it to the anode (U.S. Pat. No. 5,599,638). While this method achieves the goal of carrying concentrated (and even neat) methanol in the fuel cartridge, it suffers from a significant increase in system volume and parasitic power loss due to the need for a bulky condenser and its cooling/pumping accessories.

The second approach is a passive water return technique in which hydraulic pressure at the cathode is generated by including a highly hydrophobic microporous layer (MPL) in the cathode, and this pressure is utilized for driving water from the cathode to the anode through a thin membrane (Ren et al. and Pasaogullari & Wang, *J. Electrochem. Soc.*, pp A399-A406, March 2004). While this passive approach is efficient and does not incur parasitic power loss, the amount of water returned, and hence the concentration of methanol fuel, depends strongly on the cell temperature and power density. Presently, direct use of neat methanol is demonstrated only at or below 40° C. and at low power density (less than 30 $mW/cm^2$). Considerably less concentrated methanol fuel is utilized in high power density (e.g., 60 $mW/cm^2$) systems at elevated temperatures, such as 60° C. In addition, the requirement for thin membranes in this method sacrifices fuel efficiency and operating cell voltage, thus resulting in lower total energy efficiency.

Thus, there is a prevailing need for a direct oxidation fuel cell system that maintains a balance of water in the fuel cell and returns a sufficient amount of water from the cathode to the anode under high-power and elevated temperature operating conditions. There is an additional need for a direct oxidation fuel cell that operates with highly concentrated fuel, including neat methanol, and minimizes the need for an external water supply or condensation of electrochemically produced water.

In this regard, it is disadvantageous to store very highly concentrated fuel (e.g., from about 17 M to about 25 M methanol, i.e., neat methanol) in a fuel container or cartridge supplying the DMFC because operation with highly concentrated fuel necessitates operation at low oxidant stoichiometric ratios, e.g., less than about 2, and the electrical performance, e.g., in terms of power, declines as the oxidant stoichiometric ratio becomes smaller. In addition, the performance of the DFMC is very sensitive to variations in the air flow rate, especially at such lower oxidant stoichiometric ratios. As a consequence of these apparently competing factors, it is difficult to simultaneously achieve high power output and very high concentration fuel use with present DOFC/DMFC systems. Further in addition, it is considered important from health and environmental standpoints that the amount of undesirable substances contained in the exhaust gases from the DOFC/DMFC system be minimized, i.e., the exhaust gas from the system should be as pure as possible.

In view of the foregoing, there exists a clear need for improved DOFC/DMFC systems and methodologies which eliminates, or at least mitigates, the effects of these competing factors tending to prevent development of systems operating with very highly concentrated fuel at high conversion efficiency. In addition, there exists a clear need for DOFC/DMFC systems and methodologies which minimize the amount of environmentally undesirable substances in the exhaust gas.

SUMMARY OF THE DISCLOSURE

An advantage of the present disclosure is improved direct oxidation fuel cell (DOFC) systems.

Another advantage of the present disclosure is improved DOFC systems that operate efficiently on highly concentrated fuel with high energy conversion efficiency.

A further advantage of the present disclosure is improved methods of operating DOFC systems utilizing highly concentrated fuel at high energy conversion efficiency.

Additional advantages and other features of the present disclosure will be set forth in the description which follows and in part will become apparent to those having ordinary skill in the art upon examination of the following or may be learned from the practice of the present disclosure. The advantages may be realized and obtained as particularly pointed out in the appended claims.

According to an aspect of the present disclosure, the foregoing and other advantages are achieved in part by an improved DOFC system, comprising:

(a) at least one fuel cell assembly including a cathode and an anode with an electrolyte positioned therebetween, the at least one fuel cell assembly adapted for performing selected electrochemical reactions at the anode and cathode;

(b) a source of concentrated liquid fuel in fluid communication with an inlet of the anode;

(c) an oxidant supply in fluid communication with an inlet of the cathode;

(d) a liquid/gas (L/G) separator in fluid communication with outlets of each of the anode and cathode for receiving unreacted fuel and liquid and gaseous products of the selected electrochemical reactions at the cathode and anode; and (e) a converter for catalytically converting a portion of the unreacted fuel to the liquid and gaseous products.

According to embodiments of the present disclosure, the system further comprises:

(f) a fluid path for supplying the inlet of the anode with liquid product from an outlet of the converter, e.g., wherein the fluid path includes the L/G separator.

In accordance with an embodiment of the present disclosure, an inlet of the converter is in fluid communication with a first outlet of the L/G separator for receiving the portion of the unreacted fuel; a first outlet of the converter is in fluid communication with an inlet of the L/G separator for supplying the L/G separator with the liquid product; and a second outlet of the L/G separator is in fluid communication with the inlet of the anode for supplying the anode with a combination of the fuel and liquid product.

According to such embodiment, a second outlet of the converter is adapted for supplying at least one exhaust gas to the atmosphere.

In accordance with another embodiment of the present disclosure, a first inlet of the converter is in fluid communication with an outlet of the anode; a second inlet of the converter is in fluid communication with the oxidant supply; an outlet of the converter is in fluid communication with an inlet of the L/G separator; and an outlet of the L/G separator is in fluid communication with the inlet of the anode for supplying the anode with a combination of the fuel and liquid product.

According to such embodiment, an optional bypass conduit fluidly connects the first inlet and the outlet of said converter.

Another aspect of the present disclosure is a direct oxidation fuel cell (DOFC) system, comprising:

(a) at least one fuel cell assembly including an anode and a cathode with an electrolyte positioned therebetween, the at least one fuel cell assembly adapted for performing selected electrochemical reactions at the anode and cathode which form liquid and gaseous products;

(b) a source of concentrated liquid fuel in fluid communication with an inlet of the anode;

(c) an oxidant supply in fluid communication with an inlet of the cathode; and (d) a converter for catalytically converting at least a portion of any unreacted fuel in the at least one fuel cell assembly to the liquid and gaseous products, wherein the cathode comprises said converter.

According to embodiments of the present disclosure, an outlet of the anode is in fluid communication with the inlet of the cathode for supplying at least a portion of the unreacted fuel to the cathode for catalytic conversion thereat; the cathode includes a catalyst layer for performing said catalytic conversion of the unreacted fuel; and the system further comprises:

(e) a liquid/gas (L/G) separator with a first inlet in fluid communication with an outlet of the cathode for receiving unreacted fuel and liquid and gaseous products of the selected electrochemical reaction at the cathode.

Embodiments of the present disclosure include those wherein a first outlet of the L/G separator is in fluid communication with the inlet of the anode for supplying the anode with a combination of the fuel and liquid product; and a second outlet of the L/G separator is adapted for supplying at least one exhaust gas to the atmosphere.

According to embodiments of the present disclosure, the outlet of the anode is also in fluid communication with a second inlet of the L/G separator.

Yet another aspect of the present disclosure is a method of operating a direct oxidation fuel cell (DOFC) system comprising at least one fuel cell assembly including an anode and a cathode with an electrolyte positioned therebetween, and a liquid/gas (L/G) separator in fluid communication with at least one of the anode and cathode for (1) receiving unreacted fuel and/or liquid and gaseous products of electrochemical reactions at the anode and cathode, and (2) supplying the unreacted fuel and liquid product to an inlet of the anode, comprising:

catalytically converting a portion of the unreacted fuel from the anode to the liquid and gaseous products.

According to an embodiment of the present disclosure, the method comprises performing the catalytic conversion of the portion of the unreacted fuel utilizing a catalytic converter having an inlet in fluid communication with an outlet of the L/G separator; and further comprises supplying liquid product of the catalytic conversion back to the L/G converter, utilizing an outlet of the catalytic converter in fluid communication with an inlet of the L/G separator; and exhausting gaseous product from the L/G separator to the atmosphere.

In accordance with another embodiment of the present disclosure, the method comprises performing the catalytic conversion of the portion of the unreacted fuel utilizing a catalytic converter having an inlet in fluid communication with an outlet of the anode and an outlet in fluid communication with an inlet of the L/G separator; and further comprises supplying the L/G separator with unreacted fuel from the outlet of the anode utilizing a bypass conduit in fluid communication with the outlet of the anode and the inlet of the L/G separator.

According to still another embodiment of the present disclosure, the method comprises performing the catalytic conversion of the portion of the unreacted fuel utilizing a catalytic layer of the cathode as the catalytic converter; and further comprising supplying the cathode with the portion of the unreacted fuel utilizing an outlet of the anode in fluid communication with an inlet of the cathode. The method according to this embodiment optionally further comprises supplying the L/G separator with unreacted fuel utilizing an outlet of the anode in fluid communication with an inlet of the L/G separator.

Additional advantages of the present disclosure will become readily apparent to those skilled in this art from the following detailed description, wherein only the preferred embodiments of the present disclosure are shown and described, simply by way of illustration but not limitation. As will be realized, the disclosure is capable of other and different embodiments, and its several details are capable of modification in various obvious respects, all without departing from the spirit of the present invention. Accordingly, the drawings and description are to be regarded as illustrative in nature, and not as restrictive.

BRIEF DESCRIPTION OF THE DRAWINGS

The various features and advantages of the present disclosure will become more apparent and facilitated by reference to the accompanying drawings, provided for purposes of illustration only and not to limit the scope of the invention, wherein the same reference numerals are employed throughout for designating like features and the various features are not necessarily drawn to scale but rather are drawn as to best illustrate the pertinent features, wherein.

DETAILED DESCRIPTION OF THE DISCLOSURE

The present disclosure relates to obtaining high energy conversion efficiency with direct oxidation fuel cells (DOFC) and DOFC systems operating with highly concentrated fuel, e.g., direct methanol fuel cells (DMFC) and systems utilizing highly concentrated methanol, i.e., above about 17 M to about 25 M (neat methanol), while retaining all advantages associated with DOFC cells and systems, including, inter alia, significant space reduction leading to compact design, easy fuel storage/handling, and high energy density of the liquid fuel. In addition, the amount of undesirable substances contained in the exhaust gases from the DOFC/DMFC system is minimized.

Figure 1:
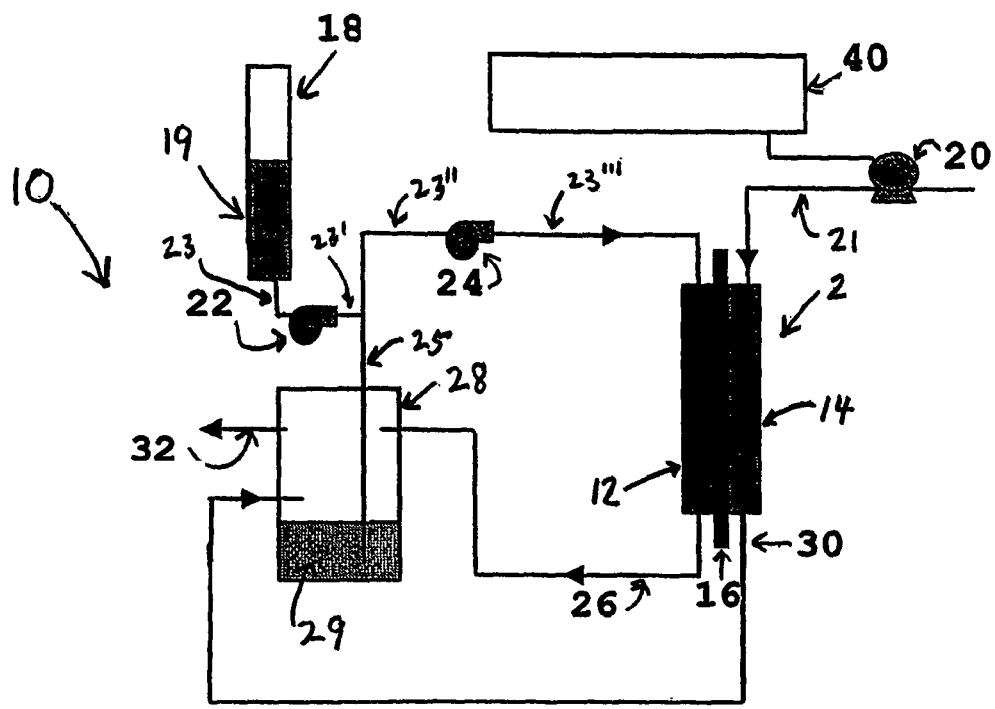
FIG. 1 is a simplified, schematic illustration of a direct oxidation fuel cell (DOFC) system capable of operating with highly concentrated methanol fuel, i.e., a DMFC system.

Referring to FIG. 1, schematically illustrated therein is an illustrative embodiment of a DOFC adapted for operating with highly concentrated fuel, e.g., a methanol-based DMFC system 10, which system maintains a balance of water in the fuel cell and returns a sufficient amount of water from the cathode to the anode under high-power and elevated temperature operating conditions. (A DOFC/DMFC system is disclosed in co-pending, commonly assigned U.S. patent application Ser. No. 11/020,306, filed Dec. 27, 2004).

As shown in FIG. 1, DMFC system 10 includes an anode 12, a cathode 14, and a proton-conducting electrolyte membrane 16, forming a multi-layered composite membrane-electrode assembly or structure 2 commonly referred to as an MEA. Typically, a fuel cell system such as DMFC system 10 will have a plurality of such MEAs in the form of a stack; however, FIG. 1 shows only a single MEA for illustrative simplicity. Typically, the membrane-electrode assemblies 2 are separated by bipolar plates that have serpentine channels for supplying and returning fuel and by-products to and from the assemblies (not shown for illustrative convenience). In a fuel cell stack, MEAs and bipolar plates are aligned in alternating layers to form a stack of cells and the ends of the stack are sandwiched with current collector plates and electrical insulation plates, and the entire unit is secured with fastening structures. Also not shown in FIG. 1, for illustrative simplicity, is a load circuit electrically connected to the anode 12 and cathode 14.

A source of fuel, e.g., a fuel container or cartridge 18 containing a highly concentrated fuel 19 (e.g., methanol), is in fluid communication with anode 12 (as explained below). An oxidant, e.g., air supplied by fan 20 and associated conduit 21, is in fluid communication with cathode 14. The highly concentrated fuel from fuel cartridge 18 is fed directly into liquid/gas separator 28 by pump 22 via associated conduit segments 23' and 25, or directly to anode 12 via pumps 22 and 24 and associated conduit segments 23, 23', 23", and 23'".

In operation, highly concentrated fuel 19 is introduced to the anode side of the MEA 2, or in the case of a cell stack, to an inlet manifold of an anode separator of the stack. Water produced at the cathode 14 side of MEA 2 or cathode cell stack via electrochemical reaction (as expressed by equation (2)) is withdrawn therefrom via cathode exit port/conduit 30 and supplied to liquid/gas separator 28. Similarly, excess fuel, water, and $CO_2$ gas are withdrawn from the anode side of the MEA 2 or anode cell stack via anode exit port/conduit 26 and supplied to liquid/gas separator 28. The air or oxygen is introduced to the cathode side of the MEA 2 and regulated to maximize the amount of electrochemically produced water in liquid form while minimizing the amount of electrochemically produced water vapor, thereby minimizing the escape of water vapor from system 10.

As indicated, during operation air is introduced to the cathode 14 (as explained above) and excess air and liquid water are withdrawn therefrom via cathode exit port/conduit 30 and supplied to the liquid/gas ("L/G") separator 28. As discussed further below, the input air flow rate or air stoichiometry is controlled to maximize the amount of the liquid phase of the electrochemically produced water while minimizing the amount of the vapor phase of the electrochemically produced water. Control of the oxidant stoichiometry ratio can be obtained by setting the speed of fan 20 at a fixed rate depending on the fuel cell system operating conditions or by means of electronic control unit (ECU) 40, e.g., a digital computer-based controller. ECU 40 receives an input signal from a $CO_2$ or $O_2$ gas sensor operatively connected to cathode exit port/conduit 30 and from a temperature sensor in contact with the liquid phase 29 of L/G separator 28 (each sensor not shown in the drawing for illustrative simplicity) and adjusts the oxidant stoichiometric ratio so as to maximize the liquid water phase in the cathode exhaust and minimize the water vapor phase in the exhaust, thereby minimizing the need for a water condenser to condense water vapor produced and exhausted from the cathode of the MEA 2. In addition, ECU 40 can increase the oxidant stoichiometry beyond the minimum setting during cold-start in order to avoid excessive water accumulation in the cell.

Liquid water 29 which accumulates in the L/G separator 28 during operation may be returned to anode 12 via circulating pump 24 and conduit segments 25, 23", and 23'". Exhaust carbon dioxide gas is released through port 32 of liquid/gas separator 28.

As indicated above, cathode exhaust water, i.e., water which is electrochemically produced at the cathode during operation, is partitioned into liquid and gas phases, and the relative amounts of water in each phase are controlled mainly by temperature and air flow rate. The amount of liquid water can be maximized while the amount of water vapor minimized by using a sufficiently small oxidant flow rate or oxidant stoichiometry. As a consequence, liquid water from the cathode exhaust can be automatically trapped within the system, i.e., an external condenser is not required, and the liquid water can be combined in sufficient quantity with a highly concentrated fuel, e.g., greater than about 5 molar (M), for use in performing the anodic electrochemical reaction, thereby maximizing the concentration of fuel and storage capacity and minimizing the overall size of the system. The water can be recovered in an existing type of anode liquid/gas separator 28, e.g., such as those typically used to separate $CO_2$ gas and aqueous methanol solution.

The direct oxidation fuel cell system 10 shown in FIG. 1 comprises at least one MEA 2 which includes a polymer electrolyte membrane 16 and a pair of electrodes (an anode 12 and a cathode 14) each composed of a catalyst layer and a gas diffusion layer sandwiching the membrane. Typical polymer electrolyte materials include fluorinated polymers having perfluorosulfonate groups or hydrocarbon polymers such as poly-(arylene ether ether ketone) ("PEEK"). The electrolyte membrane can be of any thickness as, for example, between about 25 and about 180 µm. The catalyst layer typically comprises platinum or ruthenium based metals, or alloys thereof. The anodes and cathodes are typically sandwiched by separator plates having channels to supply fuel to the anode and an oxidant to the cathode. A fuel cell can contain a plurality of such MEA's 2 with at least one electrically conductive separator placed between adjacent MEA's to electrically connect the MEAs in series with each other, and to provide mechanical support.

ECU 40 adjusts the oxidant flow rate or stoichiometric ratio so as to maximize the liquid water phase in the cathode exhaust and minimize the water vapor phase in the exhaust, thereby eliminating the need for a water condenser. ECU 40 adjusts the oxidant flow rate, hence stoichiometric ratio, according to a specific equation, illustratively equation (4) given below:

$$\xi_c = \frac{0.42(\gamma + 2)}{3\eta_{fuel}} \frac{p}{p_{sat}} \quad (4)$$

wherein $\xi_c$ is the oxidant stoichiometry, $\gamma$ is the ratio of water to fuel in the fuel supply, $p_{sat}$ is the water vapor saturation pressure corresponding to the cell temperature, p is the cathode operating pressure, and $\eta_{fuel}$ is the fuel efficiency. Such controlled oxidant stoichiometry automatically ensures an appropriate water balance in the DMFC (i.e. enough water for the anode reaction) under any operating conditions. For instance, during start-up of a DMFC system, when the cell temperature increases from e.g., 20° C. to the operating point of 60° C., the corresponding $p_{sat}$ is initially low, and hence a large oxidant stoichiometry (flow rate) should be used in order to avoid excessive water accumulation in the system and therefore cell flooding by liquid water. As the cell temperature increases, the oxidant stoichiometry (flow rate) decreases according to equation (4).

The fuel efficiency, $\eta_{fuel}$, of a DOFC system, illustratively a DMFC, is customarily defined as the ratio of the fuel cell operating current density, I, to the sum of the operating current density I and the current density equivalent of the methanol crossover rate, $I_{xover}$, as expressed by equation (5) below:

$$\eta_{fuel} = \frac{I}{I + I_{xover}} \quad (5)$$

In the case of a DMFC, it is calculated that if $\eta_{fuel}$ is 80% and the temperature of the L/G separator 28 is 60° C., $\xi_c$ is in the range from about 2.8 to about 1.8, while the fuel concentration in the fuel container or cartridge 18 is in the range from about 17 M to 25 M (i.e., pure methanol). However, as has been indicated supra, it is disadvantageous to store such very highly concentrated fuel in the fuel container or cartridge because the electrical performance, e.g., in terms of power, declines as $\xi_c$ becomes smaller. In addition, the performance of the DFMC is very sensitive to variations in the air flow rate, especially when $\xi_c$ is less than about 2.

On the other hand, electrolyte membranes which have lower methanol crossover rates than those currently employed in DMFC's (such as illustrated above) are currently being developed. For example, electrolyte membranes with lower methanol crossover rates than Nafion® 112 are becoming available, and the use of thicker membranes (e.g., Nafion® 1135, 115, and 117) for reducing fuel crossover remains a possibility.

It is expected that $\eta_{fuel}$ of DMFC's will be increased above 80% in the near future, even up to about 100%. In such eventuality, with DMFC's utilizing electrolyte membranes with low fuel crossover rates, if for example, an $\eta_{fuel}$ of about 95% and a L/G separator temperature of about 60° C. are desired, the methanol concentration in the fuel container or cartridge is very high, i.e., about 25 M, $\xi_c$ must be very low, i.e., about 1.5.

Disadvantageously, however, at such a low stoichiometry $\xi_c$ of about 1.5, the electrical performance (e.g., power output) is significantly lower than when $\xi_c$ is somewhat higher, e.g., $\xi_c$ about 2. As a consequence of these apparently competing factors, it is difficult to simultaneously achieve high power output and very high concentration fuel use with present DOFC/DMFC systems.

The present disclosure is based upon recognition that obtainment of a DOFC/DMFC system, such as system 10 shown in FIG. 1, which is capable of operating with highly concentrated liquid fuel at high power output, is possible if the DOFC/DMFC system is provided with equipment for catalytic combustion of a minor amount of unreacted fuel, e.g., methanol, to produce liquid product (water in this instance) which is recovered by the system for use in mixing with the fuel supply. Specifically, the catalytic oxidation reaction of methanol can be expressed by equation (6) below:

$$CH_3OH + 3/2O_2 \rightarrow CO_2 + 2H_2O \qquad (6)$$

which reaction is identical to the overall electrochemical oxidation reaction occurring at the anode and cathode electrodes of system 10 and expressed by equation (3) above.

According to this approach, equation (5) given above for the overall fuel efficiency $\eta_{fuel}$ is modified to include $I_{comb}$, the current density equivalent of the amount of fuel which is catalytically reacted (combusted) according to equation (6), and $\eta_{fuel}$ is then given by equation (7) below:

$$\eta_{fuel} = \frac{I}{I + I_{xover} + I_{comb}} \qquad (7)$$

Thus, according to the disclosure, a small sacrifice of fuel conversion efficiency is made in order to increase system performance. In order to avoid too great a reduction in performance, it is preferred that only an appropriate (i.e., minimum) amount of fuel be catalytically reacted according to equation (6) in order to maintain relatively high total energy conversion efficiency.

Figure 2:
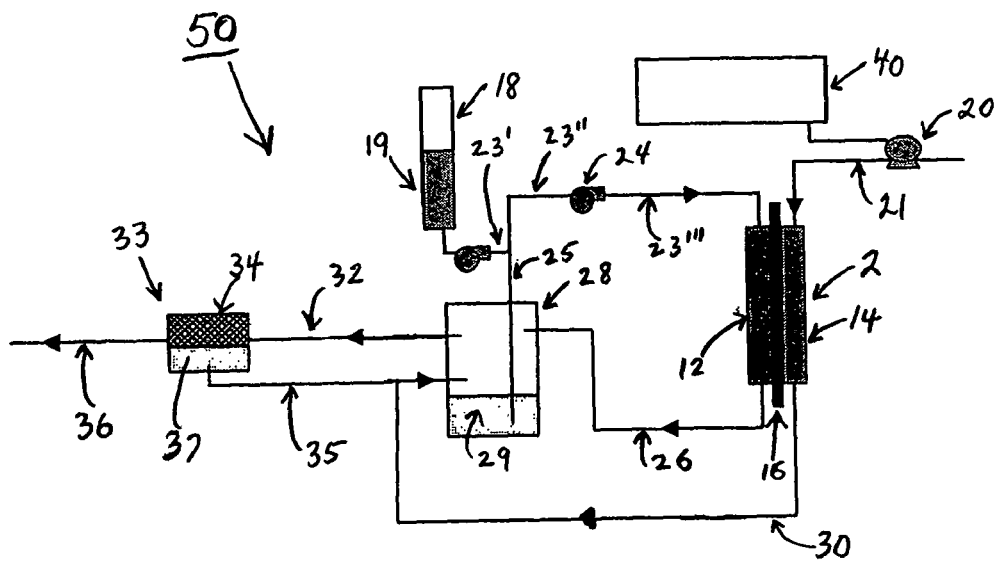
FIG. 2 is a simplified, schematic illustration of a DOFC/DMFC system according to an embodiment of the present disclosure.

Adverting to FIG. 2, shown therein is a simplified perspective view of a portion of a DOFC/DMFC system 50 according to an embodiment of the present disclosure. As illustrated, system 50 is similar to system 10 of FIG. 1; however, system 50 is provided with a catalytic converter 33 for performing a catalytic reaction, typically oxidation, of unreacted fuel, e.g., methanol oxidation as expressed in equation (6) above. According to this embodiment, a conduit/inlet to an upper, converter portion or section 34 of the catalytic converter 33 is supplied with exhaust gas containing unreacted fuel (and gases) via the exhaust conduit/outlet 32 of the L/G separator 28, and gaseous product of the catalytic reaction occurring in the upper, converter portion or section 34, e.g., $CO_2$ according to equation (6), and air, are exhausted to the atmosphere via conduit/outlet 36. Liquid product of the catalytic reaction, e.g., $H_2O$ according to equation (6), and air, are collected in lower portion or section 37 of the catalytic converter 33 and returned to the L/G separator 28 for mixing with unreacted fuel in the liquid phase 29 of the L/G separator via converter outlet/liquid recovery conduit 35. The catalytic converter 33 may be of a conventional type, with the upper, converter portion thereof comprising a noble metal catalyst, such as, for example, Pt or a PtRu alloy, supported on, e.g., a ceramic honeycomb or a porous carbon sheet.

Figure 3:
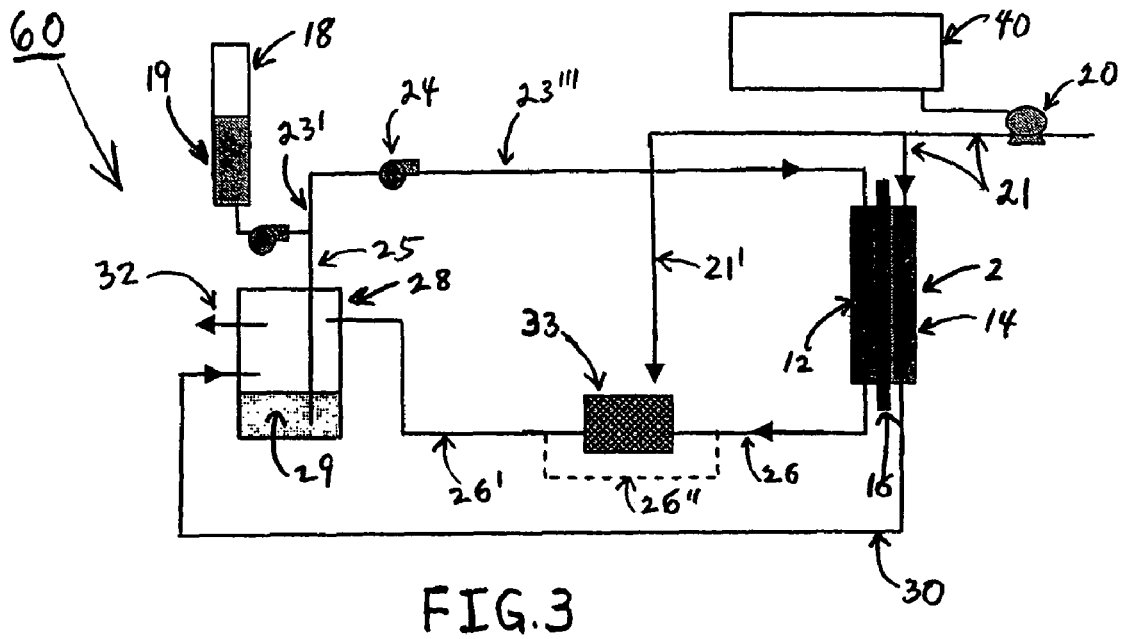
FIG. 3 is a simplified, schematic illustration of a DOFC/DMFC system according to another embodiment of the present disclosure.

Referring now to FIG. 3, shown therein is a simplified, schematic illustration of a DOFC/DMFC system 60 according to another embodiment of the present disclosure, wherein the catalytic converter 33 is positioned intermediate the conduit/outlet of anode 12 and the inlet of the L/G separator 28. According to this embodiment, a first portion 26 of the anode conduit/outlet fluidly connects the outlet of anode 12 with an inlet of the catalytic converter 33 and a second portion 26' of the anode conduit outlet fluidly connects an outlet of the catalytic converter with an inlet of the L/G separator 28. Requisite gas, e.g., air in the case of catalytic oxidation of methanol according to equation (6), is supplied to converter 33 via branch 21' of oxidant supply conduit 21. Liquid product of the catalytic reaction in converter 33, e.g., $H_2O$ in the case of catalytic oxidation of methanol according to equation (6), is supplied, along with gaseous products of the catalytic reaction (and air), to the inlet of the L/G separator 28 via the second portion 26' of the anode conduit.

According to this embodiment, a bypass conduit 26" extending from the inlet to the outlet of the catalytic converter 33 may be provided. If the fuel flow rate is low, e.g., the fuel stoichiometry ratio is less than about 1.1-1.2, bypass conduit 26" is not necessary because if all of the unreacted fuel from the anode 12 is catalytically reacted, $I_{comb}$ is not greater than about 20% of the operating current density I and $\eta_{fuel}$ is not significantly reduced.

However, if the fuel flow rate is greater than about 1.1-1.2, bypass conduit 26" is necessary, and a major proportion of the unreacted fuel must pass through it for supply to the inlet of L/G separator 28 via second conduit portion 26', and a minor proportion of the unreacted fuel catalytically reacted in converter 33. The amount of unreacted fuel passing through the bypass conduit 26" may be determined depending upon the amount of liquid product (e.g., $H_2O$) desired to be produced in the catalytic converter, e.g., according to equations (4) and (7) above, provided the fuel conversion efficiency does not decline significantly.

Figure 4:
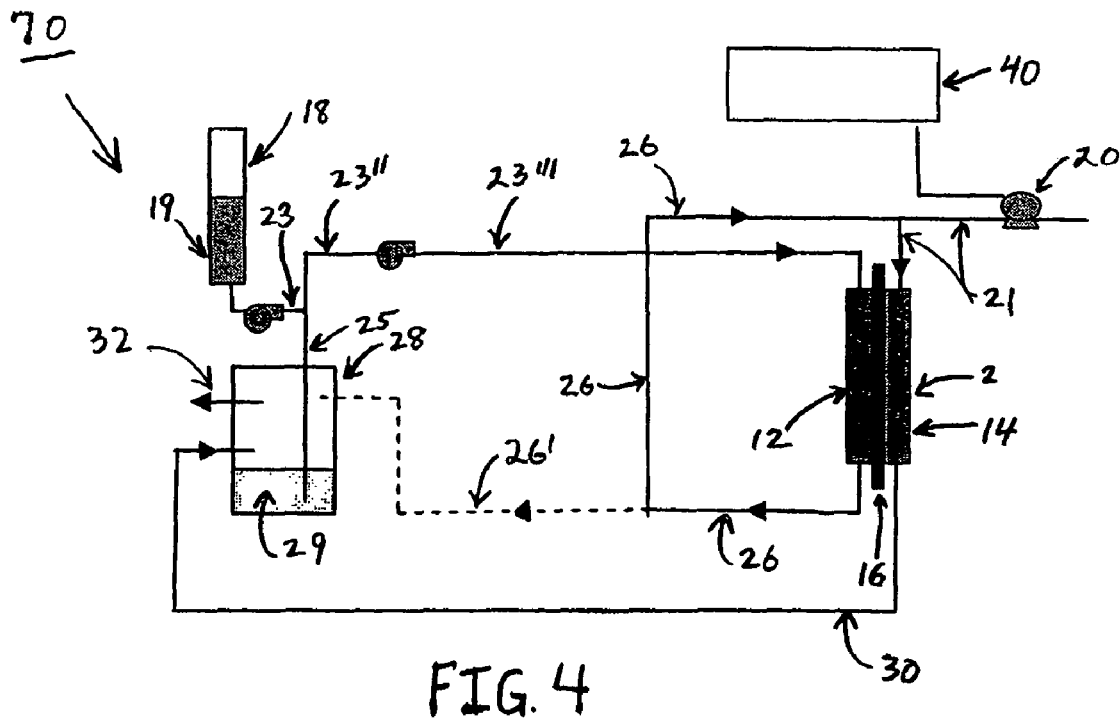
FIG. 4 is a simplified, schematic illustration of a DOFC/DMFC system according to yet another embodiment of the present disclosure.

With reference to FIG. 4, shown therein is a simplified, schematic illustration of a DOFC/DMFC system 70 according to yet another embodiment of the present disclosure, wherein the catalyst layer of the cathode electrode 14 of fuel cell 2 is utilized for catalytic conversion (combustion) of unreacted fuel from the anode electrode 12. According to this embodiment, conduit 26 fluidly connects the outlet of anode 12 with conduit 21 supplying oxidant (air) to the inlet of cathode 14. This embodiment may sacrifice performance of the system because the cathode potential is reduced; hence it is preferred when the fuel flow rate is very low, i.e., less than about 1.1-1.2.

According to a variation of this embodiment, conduit 26 includes a branch 26' (shown in the figure by a dashed line) connected to an inlet of the L/G separator (as in the previously described embodiments). The proportion of unreacted fuel from anode 12 which is supplied via conduit 26 to inlet conduit 21 of cathode 14 is determined depending upon the amount of liquid product (e.g., $H_2O$) desired to be produced according to equations (4) and (7) above, provided the fuel conversion efficiency does not decline significantly.

In addition to the above-described advantages afforded by the present disclosure, several other advantages are provided, including:

(1) the oxidant (e.g., air) flow rate can be increased according to the embodiments of the present disclosure because an increased amount of liquid (e.g., $H_2O$) is produced in the fuel cell(s), leading to an improvement in cell electrical performance and power output, while at the same time storage of very highly concentrated fuel (e.g., about 17 M-25 M methanol) in the fuel container or cartridge 18 is facilitated;

(2) exhaust gas(es), e.g., $CO_2$ and $H_2O$ vapor, discharged from the L/G separator 28 are less problematic, e.g., because the amount of unreacted fuel (e.g., methanol, formaldehyde, formic acid) discharged along with them is reduced or eliminated by the catalytic oxidation reaction; and (3) the system may be very compact, as, for example, in the embodiments illustrated in FIG. 4.

In summary, the present disclosure provides structure and methodology for optimal operation of DOFC/DMFC systems, wherein catalytic reaction (oxidation) of a minor portion of unreacted fuel exhausted from the anode electrode(s) of the fuel cell(s) is utilized for facilitating optimum current generation wherein a very high concentration of fuel (e.g., methanol) can be stored in the fuel cartridge. Also, the amount of undesirable substances contained in the exhaust gas(es) is significantly reduced by the catalytic reaction, i.e., the exhaust is purified. Finally, the present disclosure can be readily implemented on DOFC/DMFC systems by means of conventional techniques and methodologies.

In the previous description, numerous specific details are set forth, such as specific materials, structures, processes, etc., in order to provide a better understanding of the present disclosure. However, the present disclosure can be practiced without resorting to the details specifically set forth. In other instances, well-known processing materials and techniques have not been described in detail in order not to unnecessarily obscure the present disclosure.

Only the preferred embodiments of the present invention and but a few examples of its versatility are shown and described in the present disclosure. It is to be understood that the present disclosure is capable of use in various other combinations and environments and is susceptible of changes and/or modifications within the scope of the inventive concept as expressed herein.

What is claimed is:

1. A direct oxidation fuel cell (DOFC) system, comprising:
   (a) at least one fuel cell assembly including a cathode and an anode with an electrolyte positioned therebetween, said at least one fuel cell assembly adapted for performing selected electrochemical reactions at said anode and cathode;
   (b) a source of concentrated liquid fuel in fluid communication with an inlet of said anode;
   (c) an oxidant supply in fluid communication with an inlet of said cathode;
   (d) a liquid/gas (L/G) separator in fluid communication with outlets of each of said anode and cathode for receiving unreacted fuel and liquid and gaseous products of said selected electrochemical reactions at said cathode and anode; and
   (e) a converter for catalytically converting a portion of said unreacted fuel to said liquid and gaseous products, wherein a first outlet of said converter is in fluid communication with an inlet of said L/G separator and said converter supplies said L/G separator with said liquid product.

2. The system as in claim 1, further comprising:
   (f) a fluid path for supplying said inlet of said anode with liquid product from an outlet of said converter.

3. The system as in claim 2, wherein:
   said fluid path includes said L/G separator.

4. The system as in claim 3, wherein:
   an inlet of said converter is in fluid communication with a first outlet of said L/G separator for receiving said portion of said unreacted fuel; and
   a second outlet of said L/G separator is in fluid communication with said inlet of said anode for supplying said anode with a combination of said fuel and said liquid product.

5. The system as in claim 4, wherein:
   a second outlet of said converter is adapted for supplying at least one exhaust gas to the atmosphere.

6. The system as in claim 3, wherein:
   a first inlet of said converter is in fluid communication with an outlet of said anode;
   a second inlet of said converter is in fluid communication with said oxidant supply; and
   an outlet of said L/G separator is in fluid communication with said inlet of said anode for supplying said anode with a combination of said fuel and said liquid product.

7. The system as in claim 6, wherein:
   a bypass conduit fluidly connects said first inlet and said outlet of said converter.

8. A method of operating a operating a direct oxidation fuel cell (DOFC) system comprising at least one fuel cell assembly including an anode and a cathode with an electrolyte positioned therebetween, and a liquid/gas (L/G) separator in fluid communication with at least one of said anode and cathode for (1) receiving unreacted fuel and/or liquid and gaseous products of electrochemical reactions at said anode and cathode, and (2) supplying said unreacted fuel and liquid product to an inlet of said anode, comprising:
   a converter for catalytically converting a portion of said unreacted fuel from said anode to said liquid and gaseous products,
   wherein a first outlet of said converter is in fluid communication with an inlet of said L/G separator and said converter supplies said L/G separator with said liquid product.

9. The method according to claim 8, further comprising:
   exhausting gaseous product from said L/G separator to the atmosphere.

10. The method according to claim 8, further comprising:
    supplying said L/G separator with unreacted fuel from said outlet of said anode utilizing a bypass conduit in fluid communication with said outlet of said anode and said inlet of said L/G separator.

11. The method according to claim 8, comprising:
    performing said catalytic conversion of said portion of said unreacted fuel utilizing a catalytic layer of said cathode as said catalytic converter.

12. The method according to claim 11, comprising:
    supplying said cathode with said portion of said unreacted fuel utilizing an outlet of said anode in fluid communication with an inlet of said cathode.

13. The method according to claim 12, further comprising:
    supplying said L/G separator with unreacted fuel utilizing an outlet of said anode in fluid communication with an inlet of said L/G separator.

* * * * *